Aug. 21, 1923.
B. JOHNSON
MOTOR CYCLE AND AEROPLANE
Filed April 18, 1922
1,465,913
2 Sheets-Sheet 1
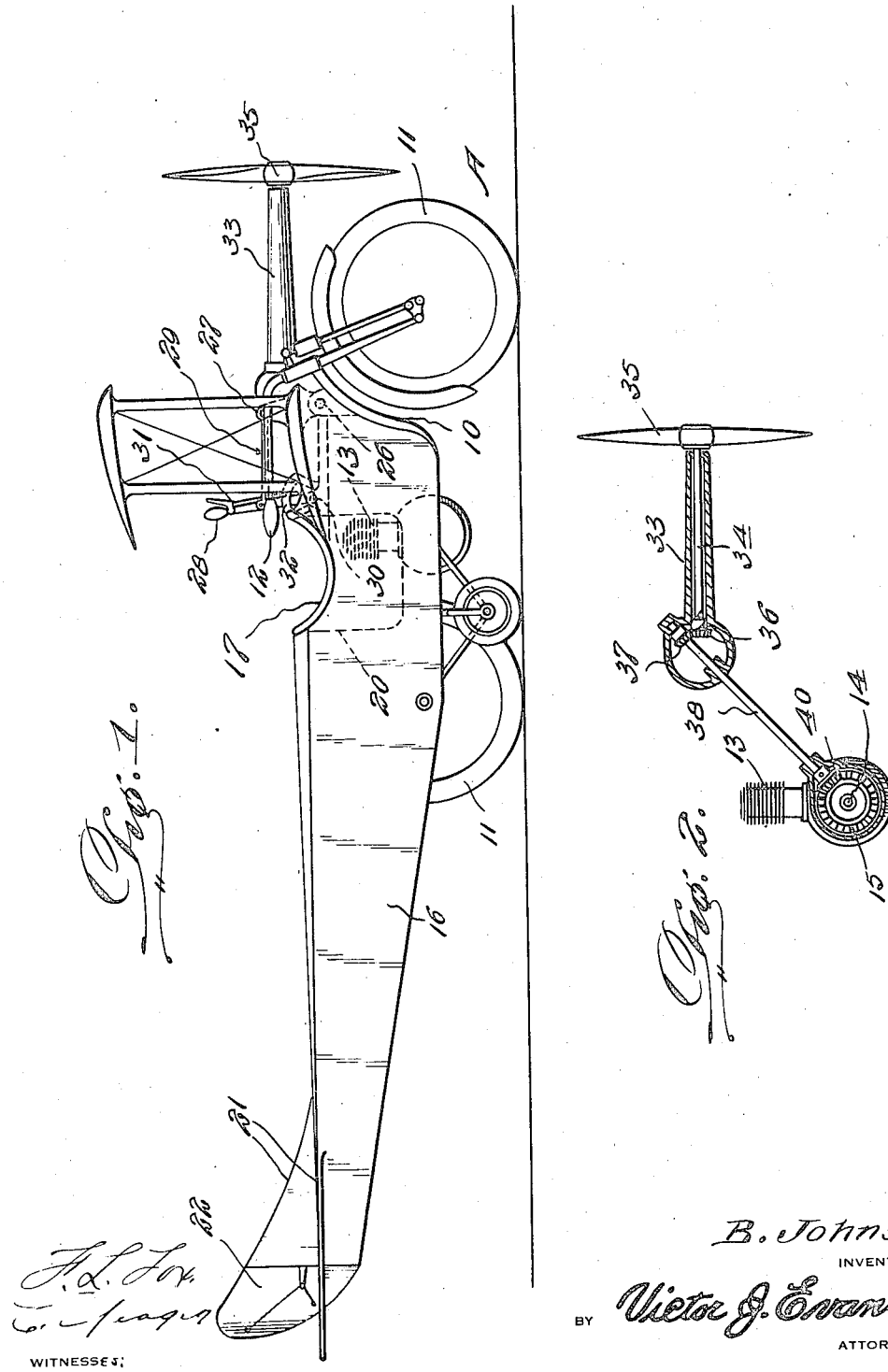

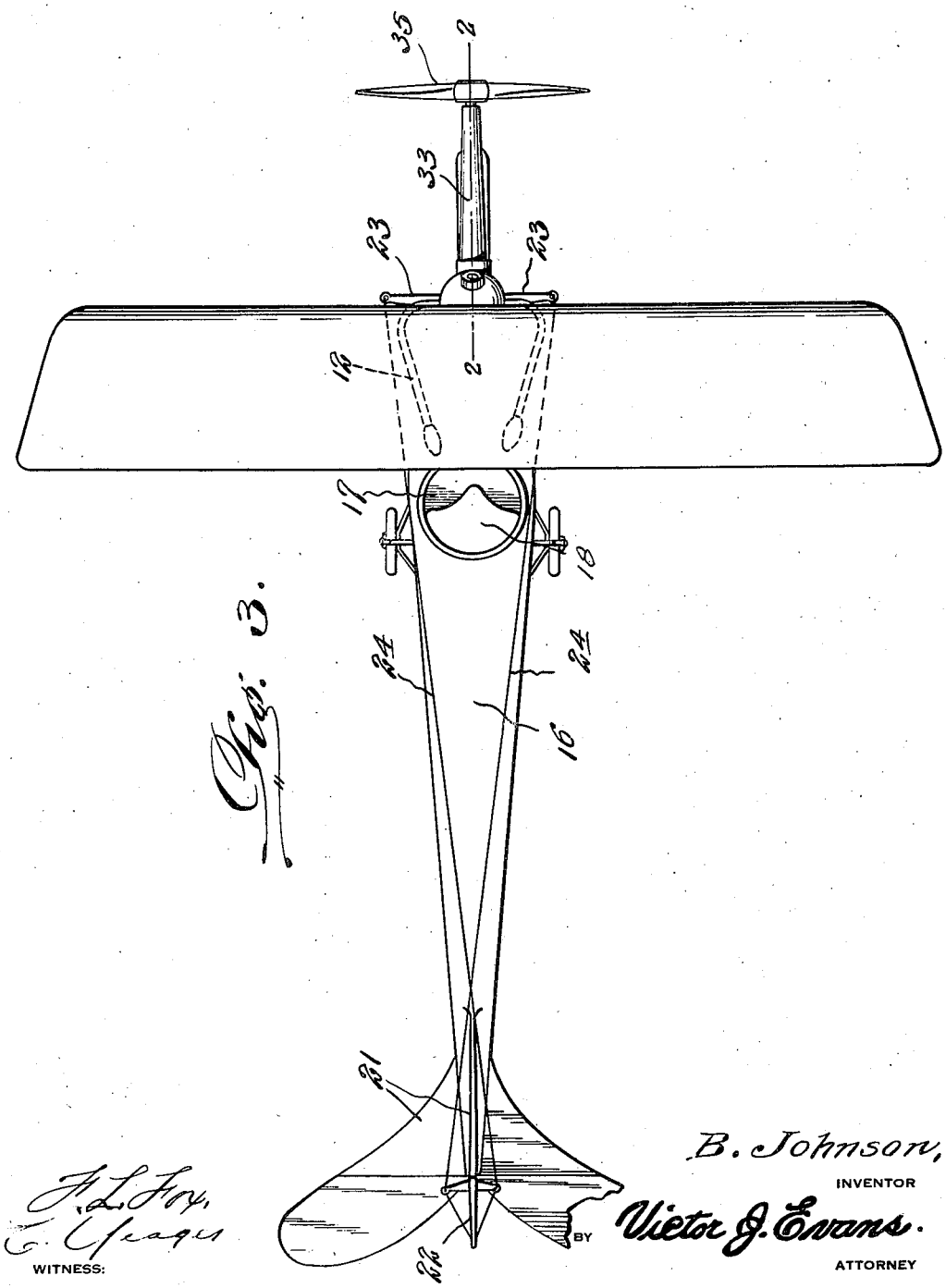

Patented Aug. 21, 1923.

1,465,913

UNITED STATES PATENT OFFICE.

BENJAMIN JOHNSON, OF LEXINGTON, KENTUCKY.

MOTOR CYCLE AND AEROPLANE.

Application filed April 18, 1922. Serial No. 554,819.

*To all whom it may concern:*

Be it known that I, BENJAMIN JOHNSON, a citizen of the United States, residing at Lexington, in the county of Fayette and State of Kentucky, have invented new and useful Improvements in Motor Cycles and Aeroplanes, of which the following is a specification.

This invention comprehends the provision of a motorcycle and aeroplane, wherein the motorcycle frame supports an aeroplane body, and its cooperating parts, a novel construction of means being provided for driving the propeller and also for guiding and steering the plane.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation of the invention partly in section.

Figure 2 is a sectional view taken on line 2—2 of Figure 1.

Figure 3 is a plan view.

Referring to the drawings in detail, A indicates generally a motorcycle, wherein 10 represents the frame, 11 the wheels, and 12, the handle bars. The motor is indicated at 13 and carried by the motor shaft 14 is a bevelled gear 15 for a purpose to be hereinafter described.

Supported upon the frame 10 of the motorcycle is an aeroplane body 16 which may be of any suitable size and configuration, and including a pit 17 in which is arranged the driver's seat 18. Access may be had to the pit by way of a door opening provided at one side of the body and which opening is normally closed by a door 20. Arranged at the rear of the body are vertically and horizontally disposed stabilizing fins 21, and a rudder 22. Associated with the handle bars is a cross piece 23 to which are secured the corresponding or adjacent terminals of flexible elements 24, the latter being attached to the rudder 22 to shift the latter incident to the turning of the handle bars.

Mounted upon the frame immediately in advance of the driver's pit are the planes, which as a unit is fulcrumed as at 26, so that the planes can be properly tilted into position to ascend or descend. The planes have associated therewith a bracket arm 27 which is connected to an operating lever 28 by means of a link or rod 29, the lever being fulcrumed as at 30, so that said planes can be very conveniently adjusted, the lever being arranged within convenient reach of the driver. The lever has associated therewith a pawl 31 which cooperates with a rack bar 32 to hold the planes in their given position.

Projecting forwardly from the frame of the motorcycle is a casing 33 in which is journaled the propeller shaft 34, the propeller being mounted upon one end of the shaft and indicated at 35. This shaft is provided with a bevelled gear 36 which meshes with a similar gear 37 carried by the connecting or operating rod 38, this rod extending from the gear 15 to the propeller shaft as illustrated in Figure 1. The connecting rod is operated by said gear 15, the latter mentioned gear meshing with a bevelled gear 40 carried by the adjacent end of the connecting rod.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

In combination, a motor cycle, including a frame, a motor, an aeroplane body supported by the frame and including a driver's pit, a rudder, means for controlling the movements of the rudder and operable with the turning of the front wheel of the motor cycle, a propeller including a shaft, a casing enclosing said shaft, a gear on one end of the shaft, a driven shaft arranged obliquely to the propeller shaft and rotated from said motor, a gear carried by the driven shaft and meshing with the propeller shaft, said driven shaft being journalled in said casing, planes arranged in advance of the driver's pit and susceptible of tilting movements, and means including an operating lever for adjusting said planes.

In testimony whereof I affix my signature.

BENJAMIN JOHNSON.